United States Patent [19]

Ommori et al.

[11] Patent Number: 4,694,370
[45] Date of Patent: Sep. 15, 1987

[54] MAGNETIC DISK CARTRIDGE

[75] Inventors: Shozo Ommori; Kengo Oishi, both of Odawara, Japan

[73] Assignee: Fuji Photo Film Co., Ltd., Japan

[21] Appl. No.: 746,962

[22] Filed: Jun. 20, 1985

[30] Foreign Application Priority Data

Jun. 22, 1984 [JP] Japan .............................. 59-93387[U]

[51] Int. Cl.$^4$ .............................................. G11B 23/03
[52] U.S. Cl. .................................... 360/133; 360/135; 369/282
[58] Field of Search ................ 360/133, 135; 206/444; 369/282, 287, 261, 77.2

[56] References Cited

U.S. PATENT DOCUMENTS 4,216,511 8/1980 Bilek ..................................... 360/133
4,544,977 10/1985 Ozawa ................................. 360/133

Primary Examiner—S. J. Heinz
Attorney, Agent, or Firm—Pasquale A. Razzano

[57] ABSTRACT

A magnetic disk cartridge containing a floppy magnetic disk is provided with center core which has a groove where the vertical part of the core meets the flange upon which the disk is fastened by a double-sided adhesive ring. This groove can accommodate a portion of the adhesive ring which is positioned out of true. This ensures that such misalignment does not cause deformation of the disk and the deterioration in read/write performance with the disk. The groove also serves to prevent flange flashing from scraping fragments off the inside of the cartridge wall, and the possible harm such fragments cause if they stick to the disk.

5 Claims, 4 Drawing Figures

MAGNETIC DISK CARTRIDGE

BACKGROUND OF THE INVENTION

1. Field of the Invention

This invention relates to a magnetic disk cartridge containing a thin, flexible, small-diameter magnetic disk which is rotated at high speed for recording and readout of data. More particularly, with respect to magnetic disk cartridges employing a center core to support the magnetic disk for such high-speed rotation, this invention relates to an improved center core support structure.

2. Description of the Prior Art

There have heretofore been provided floppy disks consisting of a base of flexible polyester sheet or the like on both sides of which is formed a layer of magnetic material in which information is magnetically recorded by means of a magnetic head while the disk is rotated at high speed. Because they are easy to handle and are low in cost, such floppy disks are widely used as recording media for computers. These advantages of floppy disks and the ability to re-use them, which is not possible with silver-halide photographic film, has caused such floppy disks to be provided in a smaller form as the image recording media in electronic still cameras. For such cameras the disks are used in the form of a magnetic disk cartridge consisting of a casing within which is rotatably housed the disk.

Such magnetic disk cartridges are provided with a center core. The round top of the center core is exposed by an opening provided in the center of the cartridge case, and the center core has a flange portion at the lower edge of its cylindrical periphery which forms a continuity with the said top. The magnetic disk is integrally supported by the flange portion, and the top of the center core is gripped by a gripping means on an electronic still camera or the like which transmits a rotation so that the center core and magnetic disk rotate together at high speed. In order to integrally affix the magnetic disk to the flange portion, a method in general use is to employ a ring-shaped double-sided adhesive member disposed between disk and flange to thereby affix the disk and flange. More specifically, the protective paper is peeled from one side of the ring-shaped double-sided adhesive member which is then lowered down over the top of the center core, with the exposed adhesive side downwards, and brought down onto the flange for adhesion thereto. The protective paper is then removed from the other side of the double-side adhesive member and the magnetic disk is also then lowered down over the center core for adhesion, integrally fastening the disk to the flange portion. However, with the conventional core, as the flange portion has had to be perpendicular to the periphery of the core, the inner edge of the flange portion that is coterminous with the periphery curves, forming a rounded slope. Consequently, the double-side adhesive member had to be provided with sufficient dimensional tolerance relative to the core periphery to allow it to be stuck in position without forcing, but this tolerance has caused misalignment of the adhesive member, with part of it riding up on the curved portion, causing curling of the magnetic disk affixed to the top, which because of the thinness of the disk produced wrinking of the disk surface.

When rotated at high speed, a magnetic disk thus deformed undulates. In small magnetic disks with very high-density storage capability, the slightest deformation or displacement of the disk produces distortion in data recorded on or read from the disk, making it difficult to achieve good recording/read-out, and in addition, especially with double-sided magnetic disks in which data is stored on both sides, such undulations cause differences in the outputs of the magnetic read/write heads which operate in contact with the two sides of the disk. Also, when the center core is of metal which has been stamped and press-formed, in many cases the flange portion retains flashing on its lower edge, and when the center core is rotated this flashing sometimes rubs against the inside wall of the cartridge casing, scraping off fragments of the wall which stick to the surface magnetic disk, causing data dropout.

SUMMARY OF THE INVENTION

The object of the present invention is therefore to provide a magnetic disk cartridge having a center core which is so constructed that no wrinkling is produced in a magnetic disk which is stuck to the upper surface of a double-sided adhesive member, even when the double-sided adhesive member which has been stuck on the flange portion is out of true within the range of dimensional tolerance, and which even if press-formed does not give rise to data dropouts caused by flashing scraping off fragments of the inner surface of the cartridge casing which stick to the surface of the magnetic disk, thereby enabling stable data recording and read-out.

The magnetic disk cartridge according to the present invention is characterized by a center core provided around the edge portion that is coterminous with the inner periphery of the flange portion with a groove extending downwards. At the minimum, the width and depth of this groove are both greater than the thickness of the double-sided adhesive member that is stuck onto the flange portion, so the groove is large enough to allow the inner rim portion of the double-sided adhesive member to be drawn therein, and not upward, if the adhesive member is adhered out of true but within the permissible dimensional limits.

As in a magnetic disk cartridge constructed thus in accordance with the present invention a groove is provided around the inner periphery of the center core flange, even if the double-sided adhesive member is stuck in place out of true, within the permissible dimensional limits, the portion of the adhesive member out of true towards the center can enter the groove, rather than ride up onto the curved, sloping surface as was the case with the conventional type, and there is therefore none of the wrinkling of the disk this caused when the disk was stuck to the adhesive member. The magnetic disk cartridge according to this invention therefore makes it possible to carry out constantly stable recording and read-out and is also suited for double-sided recording and read-out techniques. In addition, when the center core is made of metal that has been stamped out and press-formed, because the groove is provided in the same direction as flashing produced on the lower edge of the flange portion, the lower surface of the flange portion protrudes only where the groove is formed, thereby solving any problem of the flashing scraping the inner surface of the cartridge casing and producing fragments which might stick to the magnetic disk, causing dropouts.

DESCRIPTION OF THE PREFERRED EMBODIMENTS

The present invention will now be described in further detail with reference to the accompanying drawings.

Figure 1:
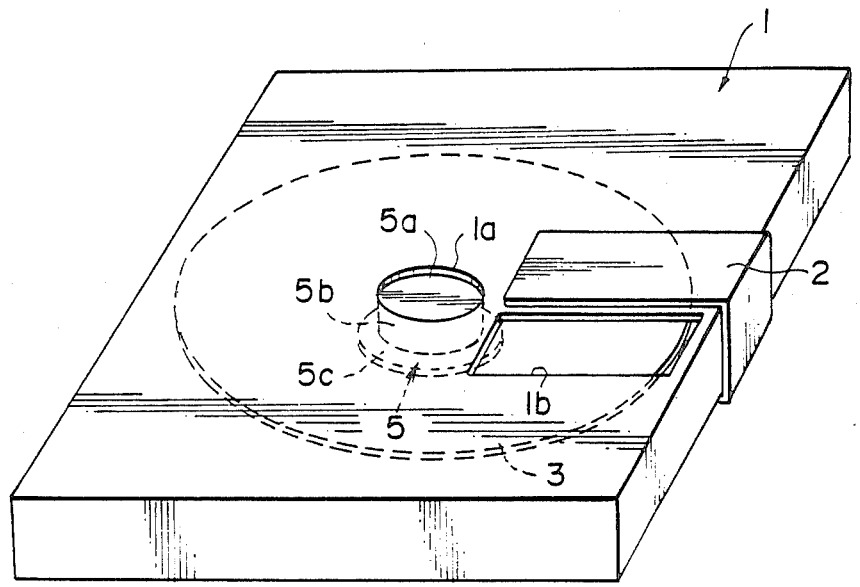
FIG. 1 is a general perspective view of a magnetic disk cartridge according to this invention.

In FIG. 1 a disk-shaped sheet of magnetic media 3 is rotatably housed in a casing 1. When the cartridge is in use, sliding a shutter 2 slidably provided on the casing 1 opens a magnetic head access window in the top of the casing 1 which exposes the magnetic disk 3 for access by an external magnetic head such as that of an electronic camera or the like, thus enabling recording and read-out to take place. The casing 1 is provided with a center core comprising: a round top face 5a which is exposed by an opening 1a in the center of the casing and which is of a radius which is smaller than the minimum radius of the flexible magnetic disk 3; a cylindrical periphery 5b contiguous with said top face; and at the lower edge of said cylindrical periphery a flange portion 5c provided with a groove 6 where it joins said periphery. This center core 5 integrally supports the magnetic disk 3, and when the cartridge is in use the top face 5a is gripped by the gripping means of an electronic camera or the like so as to thereby communicate the rotation and rotate the magnetic disk 3 at high speed.

Figure 2:
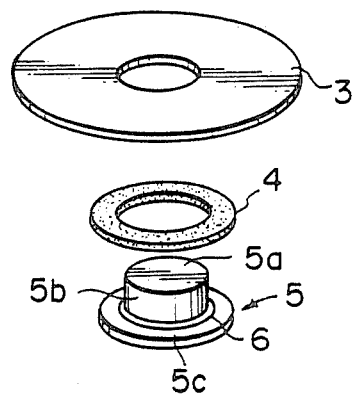
FIG. 2 is a perspective view showing the arrangement of the magnetic disk, double-sided adhesive member and the center core in the magnetic disk cartridge of this invention.
Figure 3:
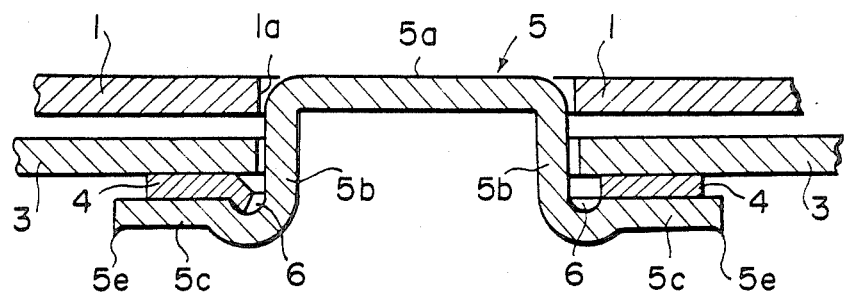
FIG. 3 is a cross-sectional view of the member of FIG. 2 fastened together.
Figure 4:
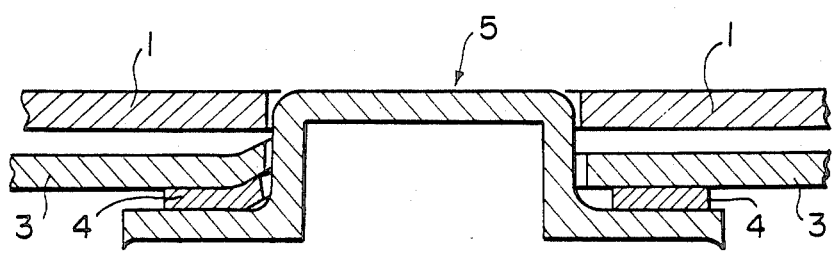
FIG. 4 is a cross-sectional view showing the same members as those of FIG. 3 fastened together in a conventional magnetic disk cartridge.

Next, with reference to the FIG. 2, a ring-shaped double-sided adhesive member 4 is lowered down around the center core 5 onto the flange portion 5c to which it is adhered. The minimum inside radius of the double-sided adhesive member 4 is slightly larger than that of the top 5a of the center core 5 and is of a size, with a tolerance, that enables it to be fitted on the flange portion 5c. The adhesive member 4 has adhesive on both sides, but when it is to be adhered to the center core 5, the upper surface, as it appears in the figure, has a peelable paper covering which is removed after the adherence of the adhesive member to the center core, thereby enabling the upper surface to assume an adhesive state. When the adhesive member 4 has been stuck to the flange portion 5c, the magnetic disk 3 is brought down into position on the center core and adhered to the double-side adhesive member 4, so as to be integrally fastened to the center core via said adhesive member, the state as shown in cross-section in the figure. As stated, the adhesive member 4 is provided with a dimensional tolerance with respect to fastening it to the center core 5, and it may thus happen that within the limits of this tolerance the adhesive member 4 is adhered to the flange portion 5c slightly out of true. However, as there is a groove 6 provided where the inner part of the flange portion 5c meets the periphery 5b, the portion of the adhesive member 4 which is misaligned inwardly can enter the groove 6, so there is no occurrence of the condition produced by the conventional center core, as shown in FIG. 4, where the adhesive member 4 rides up on the curved portion of the inner edge, and the magnetic disk is thereby adhered to the adhesive member 4 in a curled state causing wrinkling of the disk surface. The groove 6 may be of any size large enough to accommodate the portion of the adhesive member 4 which is out of alignment within the limits of dimensional tolerance, and as such the groove is to be of a width and depth larger than the thickness of the adhesive member 4. Also, the center core 5 of this embodiment being formed of stamped, press-formed metal, flashing 5e remains on the lower edge of the flange portion 5e. However, as according to this invention the groove 6 is formed during the press-forming of the center core, the lower surface of the flange portion protrudes by the amount of the depth of the groove, so when the center core 5 is rotated the flashing 5e does not damage the inner wall of the casing. The center core does not have to be made of press-formed sheet metal; any other material or method may be used to fabricate it.

We claim:

1. A rotatable magnetic disk assembly comprising:
 a magnetic disk having a centrally disposed opening therethrough,
 an adhesive member and
 a center core; said center core comprising a cylindrical member having an outer periphery which is receivable into said central opening in said magnetic disk and a flange radially extending from near an axial end of said cylindrical member, which flange has a face which is proximate to said magnetic disk and which is affixed to said magnetic disk by means of said adhesive member, said face having a circumferential groove therein substantially adjacent to said outer periphery of said cylindrical member so that if said adhesive member is misaligned with respect to said cylindrical member within a tolerance, a portion of said adhesive member can enter said groove to reduce deformation of the magnetic disk.

2. The magnetic disk assembly as defined in claim 1, wherein said adhesive member has a predetermined thickness and said groove has a depth greater than the thickness of said adhesive member.

3. The magnetic disk cartridge as defined in claim 1, wherein said adhesive member has a predetermined thickness and said groove has a width greater than the thickness of said adhesive member.

4. A magnetic disk cartridge comprising:
 a casing having an inner wall,
  a magnetic disk assembly rotatably housed in said casing, said magnetic disk assembly having
  a magnetic disk having a centrally disposed opening therethrough,
  an adhesive member and
  a center core; said center core comprising a cylindrical member having an outer periphery which is receivable into said central opening in said magnetic disk, said center core further having a flange radially extending from an axial end of said cylindrical member, said flange having a face proximate to said magnetic disk and which is affixed to said disk by means of an adhesive member, said proximate face further having a circumferential groove therein substantially adjacent to said outer periphery of said cylindrical member so that if the adhesive member is misaligned with respect to said cylindrical member within a tolerance, a portion of sasid adhesive member can enter said groove to reduce deformation of the magnetic disk; said flange further having a face which is distal from said magnetic disk, said face having a radial edge which may contain axially projecting imperfections, said center core further having an end which is distal to said magnetic disk, said distal end having a circumferential protrusion which is disposed radially inward of said radial edge of said distal face and directly opposed to said inner wall of said casing, said protrusion extending axially beyond said distal face a distance sufficient to prevent imperfections at said radial edge from coming into contact with said inner wall of said casing and damaging said inner wall.

5. The magnetic disk cartridge as defined in claim 4, wherein said protrusion is disposed substantially axially aligned with said groove.

* * * * *